(12) United States Patent
Alcorn et al.

(10) Patent No.: US 8,884,973 B2
(45) Date of Patent: Nov. 11, 2014

(54) SYSTEMS AND METHODS FOR RENDERING GRAPHICS FROM MULTIPLE HOSTS

(75) Inventors: Byron Alan Alcorn, Fort Collins, CO (US); Jeffrey Joel Walls, Fort Collins, CO (US); Donley Byron Hoffman, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 957 days.

(21) Appl. No.: 11/123,435

(22) Filed: May 6, 2005

(65) Prior Publication Data
US 2006/0250387 A1 Nov. 9, 2006

(51) Int. Cl.
*G06F 15/16* (2006.01)
*G06T 15/00* (2011.01)

(52) U.S. Cl.
CPC ........... *G06T 15/005* (2013.01); *G06T 2210/52* (2013.01)
USPC ............................. 345/504; 345/501; 345/502

(58) Field of Classification Search
USPC .............. 345/419, 504, 505, 506; 725/9, 120, 725/109; 709/201, 246
See application file for complete search history.

(56) References Cited

U.S. PATENT DOCUMENTS

| 4,949,280 | A | * | 8/1990 | Littlefield | 345/505 |
|---|---|---|---|---|---|
| 5,251,295 | A | * | 10/1993 | Ikenoue et al. | 345/504 |
| 5,793,410 | A | * | 8/1998 | Rao | 725/120 |
| 6,718,551 | B1 | * | 4/2004 | Swix et al. | 725/9 |
| 7,092,983 | B1 | * | 8/2006 | Tyrrell, III | 709/201 |
| 7,266,616 | B1 | * | 9/2007 | Munshi et al. | 709/246 |
| 2003/0088878 | A1 | * | 5/2003 | Rogers et al. | 725/109 |
| 2003/0164834 | A1 | * | 9/2003 | Lefebvre et al. | 345/506 |
| 2006/0095912 | A1 | * | 5/2006 | Wood-Gaines et al. | 718/100 |

OTHER PUBLICATIONS

Presentation entitled "sv-7 Blazing Visualization on a Commodity Cluster" by Byron Alcorn, hp invent, Jul. 2003, 23 pages.

* cited by examiner

*Primary Examiner* — Phi Hoang

(57) ABSTRACT

A system is provided for rendering graphics. The system comprises a plurality or render nodes configured to collectively render a graphics image in response to graphics information supplied from a selected host, at least two hosts operatively coupled to the plurality of render nodes, the at least two hosts comprising the selected host, and logic for selectively configuring the plurality of render nodes to render a graphics image based on content supplied by the selected host.

22 Claims, 8 Drawing Sheets

SYSTEMS AND METHODS FOR RENDERING GRAPHICS FROM MULTIPLE HOSTS

BACKGROUND

The rendering of three-dimensional computer graphics is a computationally intensive process. In many high-end applications, three-dimensional computer graphics are rendered using a pool or cluster of computers, which share the processing responsibilities. In such a system, one computer may be configured to execute at least one application program and communicate graphics data to other computers for rendering. In this regard, a collection of computers may be configured to cooperatively render a graphics image and may receive the graphics data to be rendered from the computer executing the application program.

When multiple computers are used to render a single scene, the video signals generated by each of those computers are combined into a single aggregate (or composite) signal and encoded in a particular format, such as NTSC (National Television Standards Committee), PAL (phase alteration by line), etc. There exist devices called compositors that perform the function of combining (or compositing) multiple video signals into a single, composite video signal. Accordingly, there are known approaches for performing the functions of a compositor.

Reference is now made to the drawings, in which FIG. 1 illustrates a multi-node system for rendering three-dimensional graphics. Many high-end or intensive graphic programs are executed, and graphics images are rendered, using a plurality of computers in combination. There are various ways in which multiple computers are configured to operate either in parallel or in conjunction to perform a graphics-rendering task. One way is to configure one computer 110 to operate as a master, and configure the remaining plurality of computers 120 to operate as slaves. In the illustrated embodiment, the slave computers 120 are configured to collectively render a three-dimensional graphics image. The rendering among the slave computers 120 are partitioned in a variety of ways. One way is to subdivide the screen space into various partitions and have each slave computer render the data associated with its partition. Another way is to partition the graphics data into layers and have each slave 120 render one or more layers.

In the system illustrated in FIG. 1, the master computer 110 executes an application program 112 that involves the rendering of three-dimensional graphics. The control and functionality of the application program 112 is handled by the master computer 110. As well, the master computer 110 is handled various two dimensional graphics rendering that is incidental to the execution of the application program 112. For example, the presentation of drop-down menus or other items of presentation that do not require three-dimensional rendering is performed by the master computer 110. Each of the computers (master computer 110 and each of the slave computers 120) comprises a graphics card (or other graphics circuitry) that outputs a signal for a video display 140. Since, however, the content that is rendered by each of the computers are first combined, the video outputs of each of the computers are delivered to a compositor 130. A compositor 130 operates to combine the content of each of the plurality of input video signals to deliver a single, composite output signal 132 that is used to drive a display device 140.

An alternative environment comprises multiple displays 140 that are configured to operate as a single logical display. There are a variety of applications in which graphics information is presented over a panel or matrix of displays, to effectively emulate a single, large display. Examples of such systems include: real estate, financial (such as the stock market), control room, large engineering processes, military mapping, telecommunications, etc. Such systems require the output of large amounts of data, which can easily exceed the viewable display capacity of a single, physical monitor (a user could view relevant data only by panning and zooming).

In a system environment such as that of FIG. 1, the computer 110 executing the graphics application program communicates to the cluster of render nodes 120 the relevant data utilized for carrying out the rendering operations. The structure and content of such data will be known and appreciated by persons skilled in the art, as it is the underlying data specifying primitives, texture, lighting, shading, and other aspects employed for rendering a given graphics image. In one embodiment, such information is communicated by the master 110 to the individual slave computers as appropriate, based upon the partitioned operation of the slave units. In other embodiments, the data is communicated to a defined slave computer that is running a process or program that would further subdivide and allocate the underlying graphics information to individual slave nodes for processing.

Reference is now made to FIG. 2, which illustrates an alternative configuration of a prior art system similar to that illustrated in FIG. 1, except that the system in FIG. 2 is a multi-host graphics system. In such a system, multiple hosts are provided to allow a user to render graphics under differing operating platforms, or alternatively to utilize different operating platforms in support of different application programs for graphics applications. For example, a first host 210 may be configured to operate under a windowing platform, such as Microsoft Windows. A second host 220 may be configured to operate under a Unix or other operating system platform. Render clusters 211 and 221 are dedicated for operation with each of the independent host computers 210 and 220, respectively. Outputs of each host/render cluster group (210/211 and 220/221) are coupled to a compositor 230 and 231, respectively. Compositors 230 and 231 generate composite signals corresponding for the corresponding host/render cluster group. A KVM (keyboard, video, mouse) 225 or other switching mechanism is provided to controllably select an active host/render cluster group for output to a display 240, where the relevant graphics may be visibly displayed.

It should be appreciated that such a system results in excess overhead in that it utilizes multiple render clusters, when only one cluster is effectively operational to control the viewing display at a given time.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION

Reference is made herein to various embodiments of the present invention. The embodiments illustrated and described herein are graphics systems configured to render three-dimensional graphics. It should be appreciated, however, that embodiments of the present invention, as claimed herein, apply to two-dimensional graphics systems as well.

Figure 1:
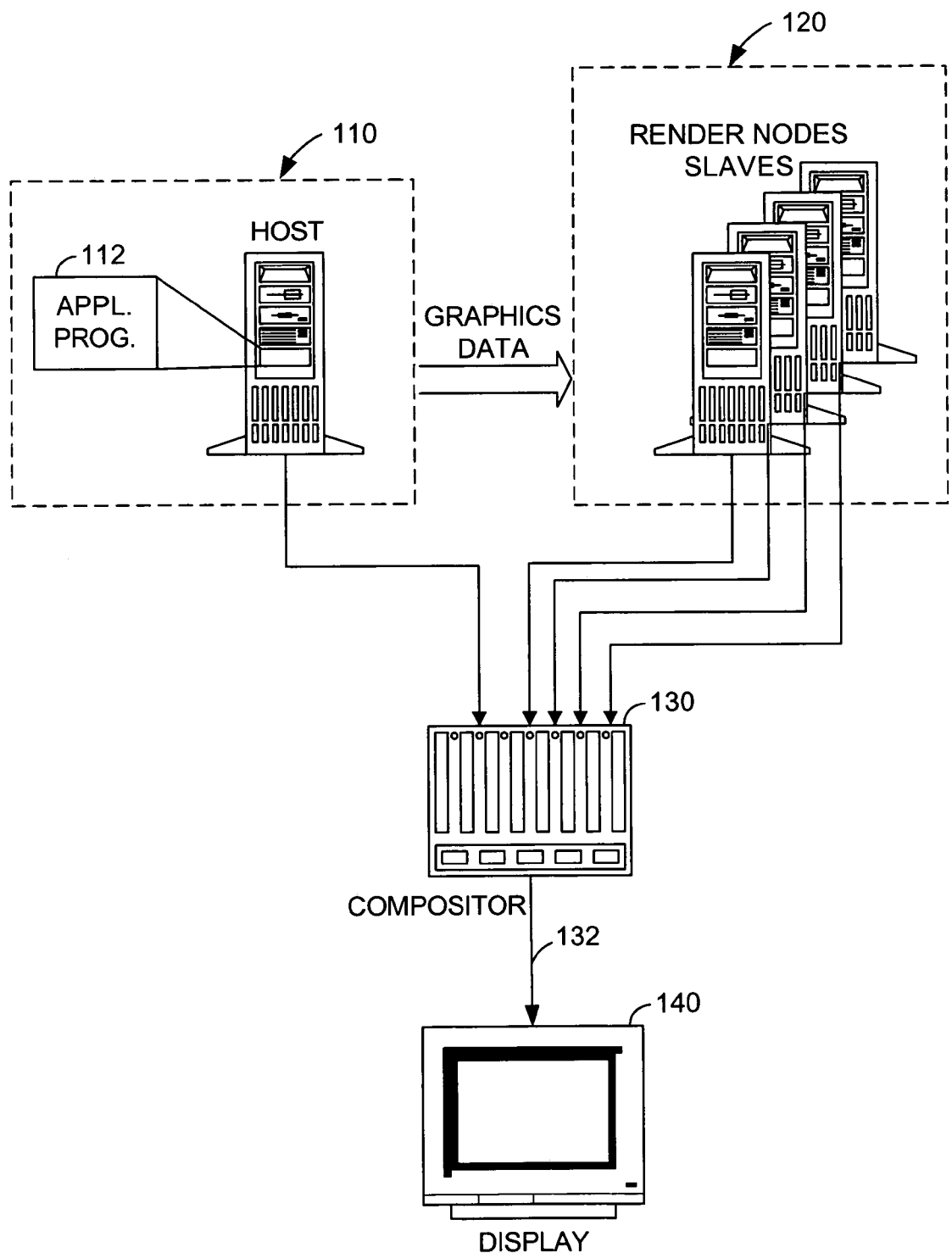
FIG. 1 is a diagram illustrating a multi-node three-dimensional graphics rendering system.
Figure 2:
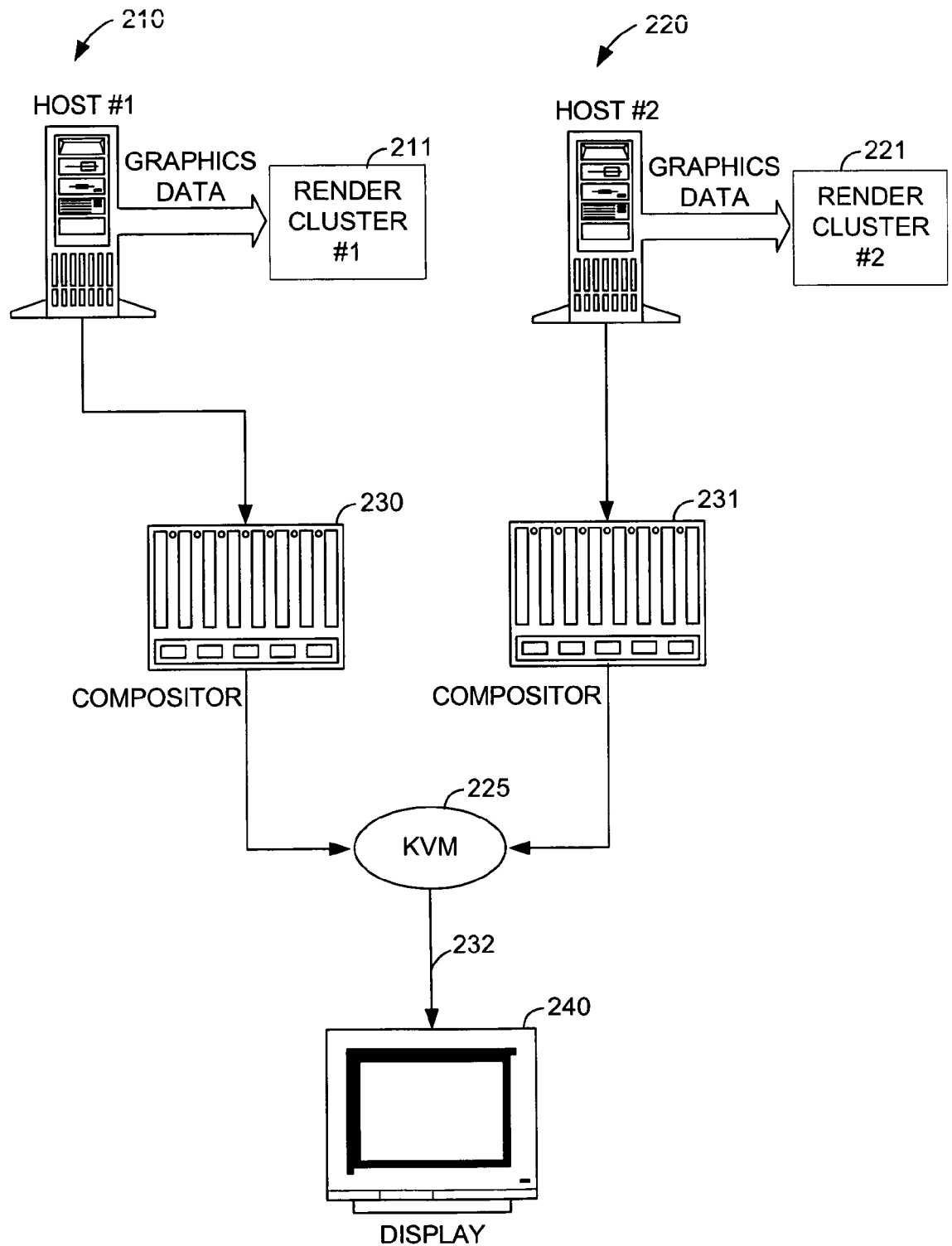
FIG. 2 is a diagram illustrating a multi-host three-dimensional computer graphics system.
Figure 3:
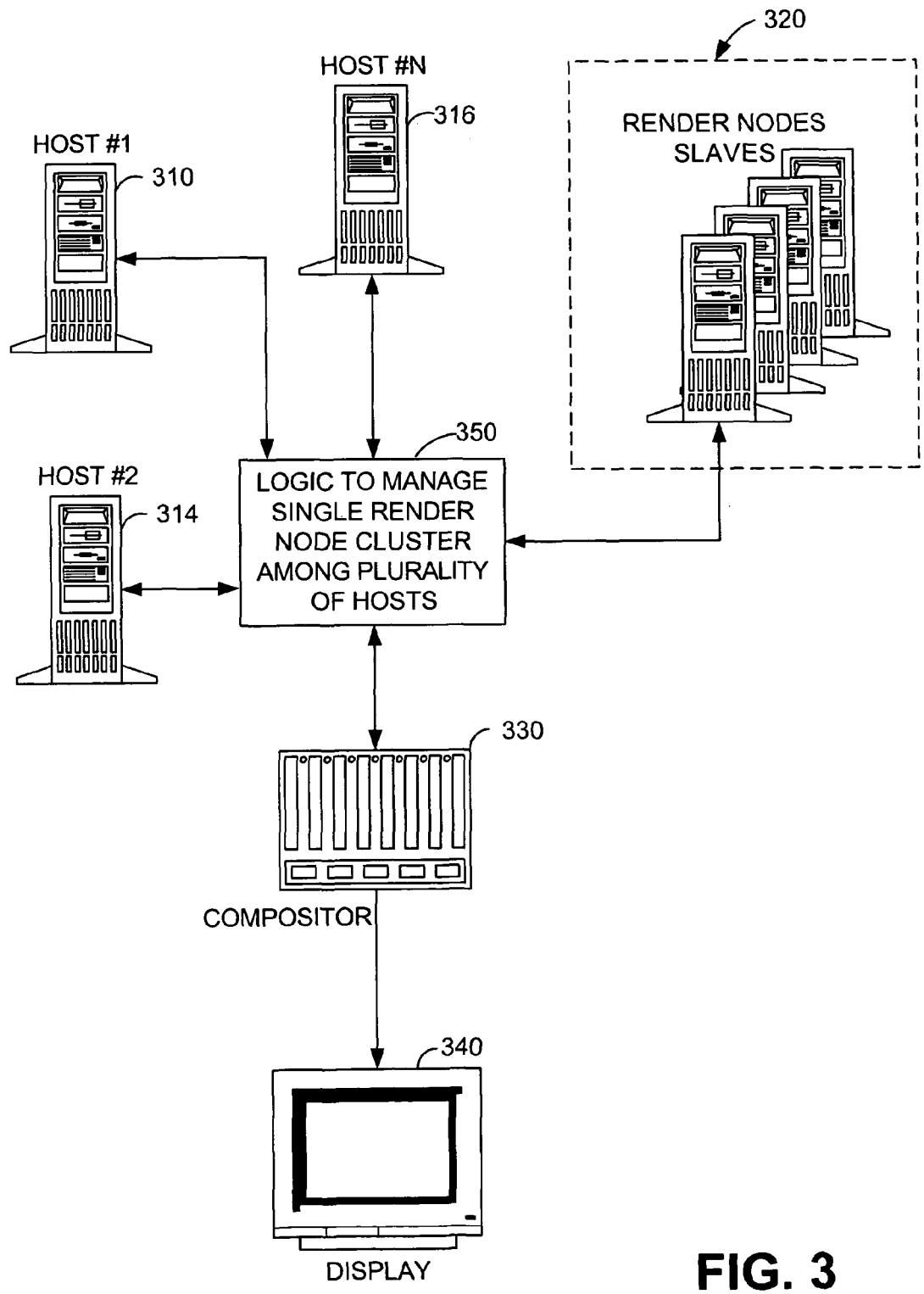
FIG. 3 is a diagram illustrating an embodiment of a multi-host computer graphics system for rendering three-dimensional graphics, in accordance with an embodiment of the present invention.

Reference is now made to FIG. 3, which is a diagram illustrating principle components of an embodiment of the present invention. In the embodiment of FIG. 3, a plurality of hosts 310, 314, and 316 are configured to independently execute application programs that provide for the rendering of three-dimensional graphics using a single render node cluster 320. Logic 350 is provided to manage the sharing of the single render node cluster 320 among the plurality of hosts 310, 314, and 316. The structure and operation of logic 350 may be embodied in a variety of forms, and several embodiments of which will be described herein. A compositor 330 receives the digital video (e.g., DVI) output from each of the nodes of the render cluster 320 and delivers a single, composite video signal for display on a graphics display 340. Consistent with the scope and spirit of the embodiment illustrated in FIG. 3, the logic 350 may be embodied within the compositor 330, or may be physically separated from the compositor 330, but communicatively coupled therewith. In addition, communications among the various components (e.g., host and slave nodes) occur across a network in one embodiment.

Figure 4:
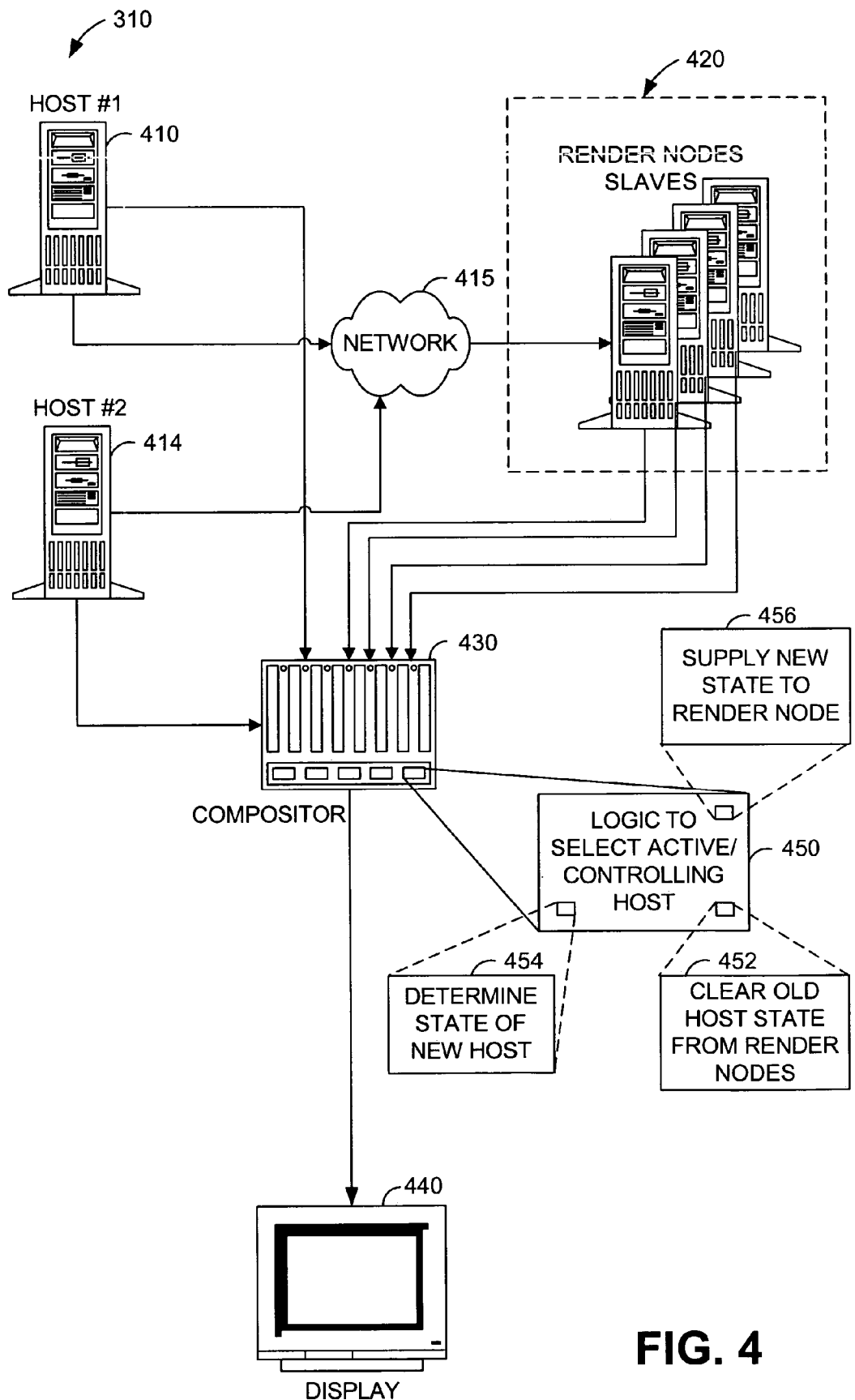
FIG. 4 is a diagram illustrating an alternative embodiment of a multi-host computer graphics system for rendering three-dimensional graphics, in accordance with an embodiment of the present invention.

Reference is now made to FIG. 4, which is a diagram illustrating a two-host graphics rendering system. In the embodiment of FIG. 4, host 410 and host 414 are configured to independently and alternatively supply graphics information to a single cluster of render nodes 420 via a network 415. Logic 450 is provided within the compositor 430 for selecting an active or controlling host, such that either host 410 or host 414 is operative at a given time to provide graphics information to the single cluster 420 of render nodes for rendering to the compositor 430.

In operation, both host computers 410 and 414 may be executing application programs that require three-dimensional graphic rendering for display. At a given time, the system is configured to display the graphic output generated by the application program running on host 410. During this time, the application program running on host 414 may continue to run, but visible output would not be visibly observable by the user. Stated another way, the application program operating on host 414 may continue to output graphics data for rendering and be completely unaware or unaffected by the fact that the data is not actually being rendered. At a later time, the system is signaled or controlled to reconfigure such that host 414 becomes the active host for visible rendering. Then, the logic 450 operates to clear the current state of the render nodes 420 and replace it with the relevant state and graphics data/content that is appropriate for rendering the current state for the application program running on host 414. For this purpose, logic 450 comprises logic 452 configured to clear old host state from the render nodes. In the above-example, the old host state would include the graphics state and information that was relevant to the application program running on host 410. Logic 450 further comprises logic 454 that is configured to interrogate host 414 to determine the state of the newly selected host. In addition, the logic 450 comprises logic 456 to supply the determined state to the render node cluster 420, so that the render nodes can perform the appropriate render operation and supply their respective outputs to compositor 430 for display on the display 440.

It should be appreciated that the changing of the active or controlling host, as described above, has the perceptible effect of enabling a user to view (on the display) the output of a first host, and then switch to another host and view the output of it.

It should be appreciated that each slave within the render cluster 420 operates substantially independent from the other slave computers, insofar as the graphics information output from the video outputs of each is not synchronized (from a timing standpoint) with the other render nodes. The embodiments described herein may include systems and methods for providing efficient synchronization of the video signals output from the independent slave nodes to the compositor 130. Such systems and methods may be as described in co-pending application Ser. No. 10/899,961, filed on Jul. 27, 2004, and entitled "Systems and Methods for Generating a Composite Video Signal from a Plurality of Independent Video Signals."

It should be appreciated that, in accordance with the scope and spirit of the present invention, the logic 450 and sub-components described in FIG. 4 may be implemented in a variety of ways. In addition, the manner and mechanism for selecting a current active or controlling host computer may be implemented in different ways. Two such ways are illustrated in FIG. 5 and FIG. 6.

Figure 5:
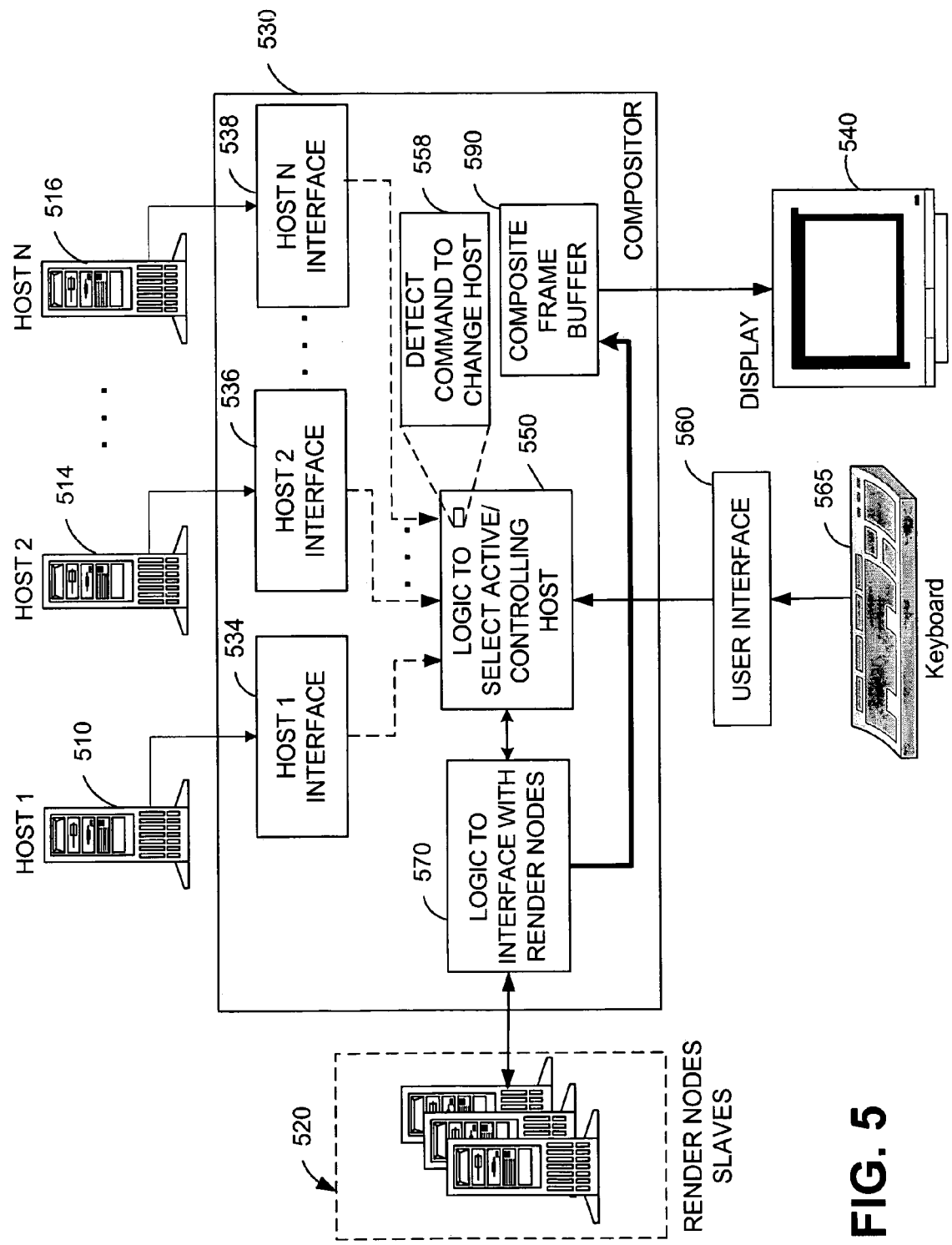
FIG. 5 is a diagram illustrating an alternative embodiment of a multi-host computer graphics system for rendering three-dimensional graphics, in accordance with an embodiment of the present invention.
Figure 6:
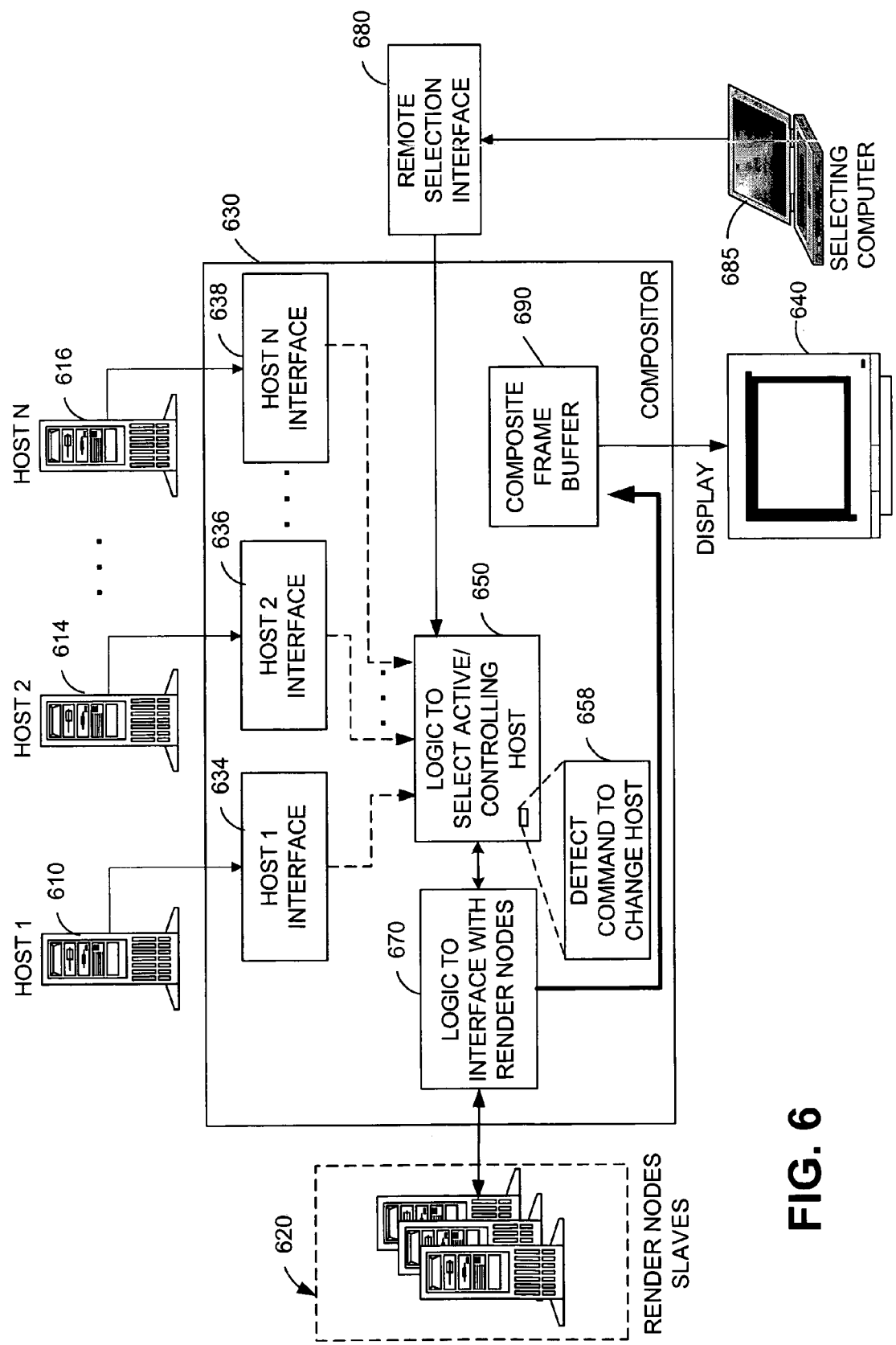
FIG. 6 is a diagram illustrating an alternative embodiment of a multi-host computer graphics system for rendering three-dimensional graphics, in accordance with an embodiment of the present invention.

FIG. 5 is a diagram illustrating an embodiment of the invention in which a single keyboard 565 is provided for controlling the selection of the current active or controlling host. In this regard, keyboard 565 is the standard input keyboard that is used by a user for interfacing with the application programs running on the various host computers. Though a dedicated key, hotkey sequence, or other event from a keyboard 565 (e.g., keyboard "event"), the system is configured to change the active host. The logic 550, which is configured to select an active or controlling host comprises logic 558, is further configured to detect a command or instruction signifying the change.

In the illustrated embodiment, this command or instruction is initiated through a hotkey or other sequence from a keyboard 565, which is coupled to the compositor 530 via a user interface 560. As illustrated, the user interface 560 may be an independent block, such as a keyboard and mouse switchbox. It will be appreciated that the keyboard 565 may be configured with the remainder of the system in alternative ways, consistent with the scope and spirit of embodiments of the invention. For example, in another embodiment, the user interface 560 is incorporated in the compositor 530. In yet another embodiment, the user interface 560 is coupled with (or embedded within) one of the hosts, where the keyboard "events" are captured and communicated to the active host.

The system also comprises logic 570 to interface with the render node cluster 520, whereby logic 570 receives the various digital output streams from each of the independent render nodes. Again, reference is made to co-pending application Ser. No. 10/899,961, which describes mechanisms for receiving and combining the portions of the graphics image generated by each of the render nodes and rendering into a composite frame buffer 590. Co-pending application Ser. No. 10/899,961 is hereby incorporated by reference.

As illustrated, the compositor 530 also comprises interfaces 534, 536, and 538 for interfacing with each of the independent host computers. It should be appreciated that many features have been omitted from the illustration of FIG. 5, as FIG. 5 is provided to illustrate the utilization of a single keyboard 565 for providing both user input to the application programs running on the host computers 510, 514, and 516, as well as providing the signaling for selecting a new active or controlling host.

An alternative embodiment is illustrated in FIG. 6, which is similar to the embodiment of FIG. 5, except a separate keyboard or computer 685 is utilized for providing the signaling for a new active or controlling host computer. An output of this computer 685 may be directed to an a remote selection interface 680, which may be further coupled to the logic 650 for selecting an active or controlling host. In one embodiment, this remote selection interface 680 may be an X-host interface, which is an interface implemented in an X system (sometimes referred to as an X-windowing system, which is a windowing system provided under Unix). As discussed in connection with the user interface of FIG. 5, in one embodiment, the remote selection interface 680 is implemented within the compositor 630. In another embodiment, the remote selection interface 680 is implemented as a part of or is coupled to one of the hosts in the system, which the active host selection being identified and communicated to the compositor 630 and active host. The logic 650, which is configured to select an active or controlling host comprises logic 658, is further configured to detect a command or instruction signifying the change.

Other features and operations of the embodiment of FIG. 6 may be understood by reference to the descriptions of the embodiments and features in FIGS. 4 and 5.

Figure 7:
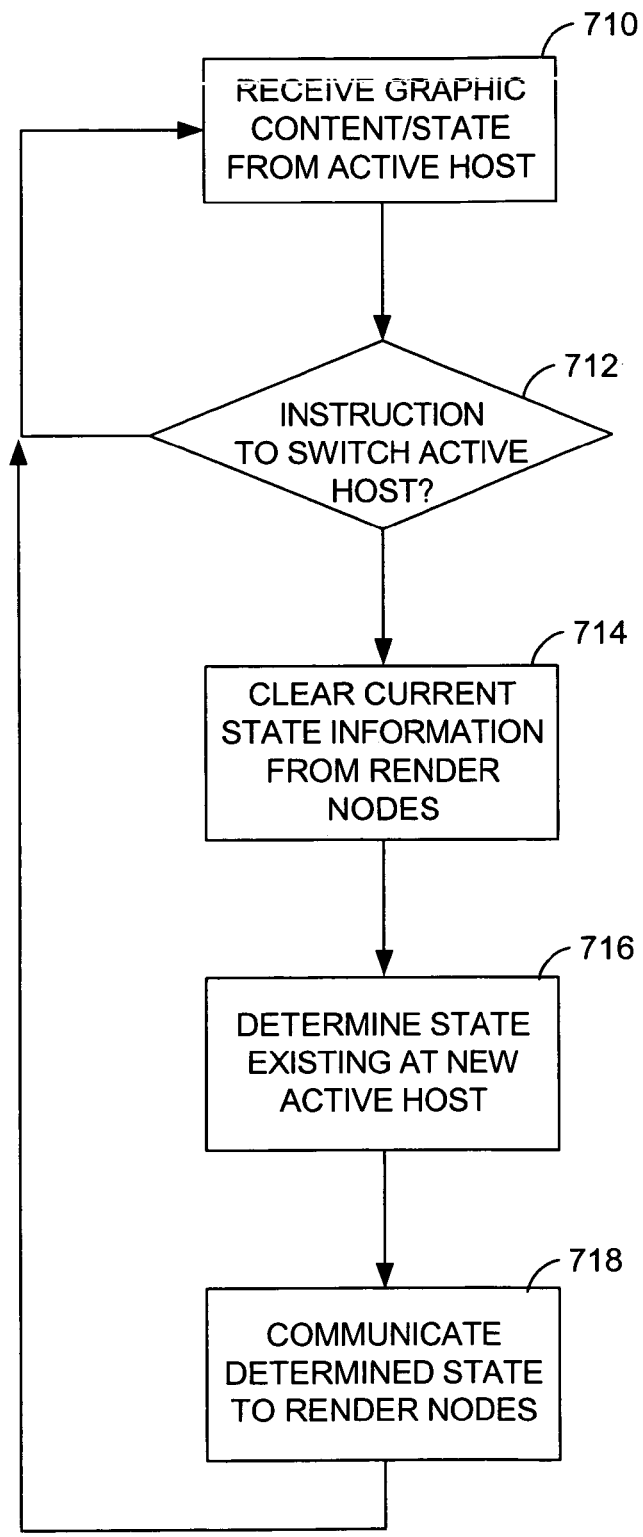
FIG. 7 is a flow chart illustrating the top-level operation of a method constructed in accordance with an embodiment of the present invention.

Reference is now made to FIG. 7, which is a flow chart illustrating the top-level operation of one embodiment of a method of the present invention. In this embodiment, a single cluster of render nodes receives graphic content and state information from an active host (710). The single cluster of render nodes operates to render the relevant three-dimensional graphics and provide respective outputs to a compositor that generates a composite video signal for delivery to a display. The receipt, by the single render cluster, of the graphic content and state information from the currently-active host continues until an alternative host is selected (712). Upon selection of a new host that assumes the role of the active or controlling host, the system operates to clear current state information from the single render node cluster (714). The system interrogates the newly selected active or controlling host to determine the current state existing in that host (716). The system then communicates the determined state information to the single render node cluster, which then renders to the compositor the graphics content relevant to the newly selected active or controlling host (718).

Figure 8:
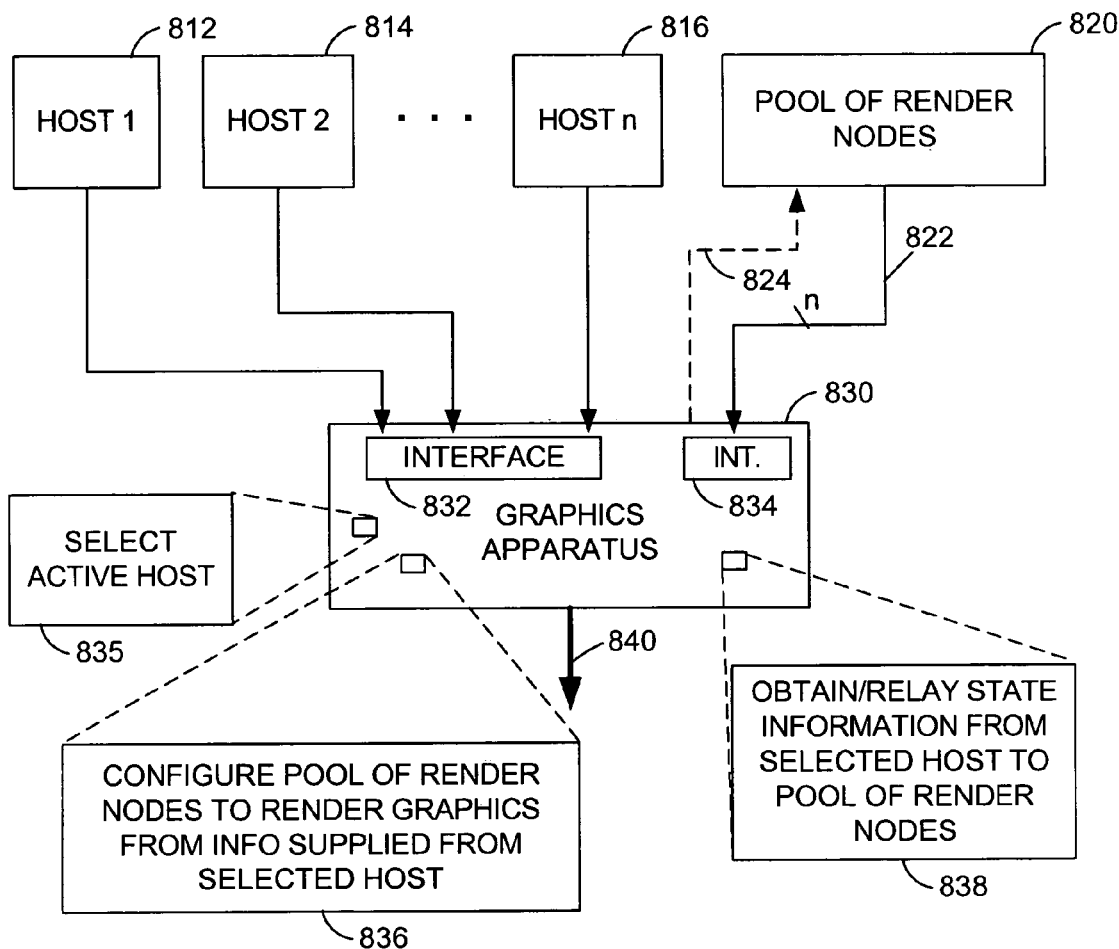
FIG. 8 is a diagram illustrating an alternative embodiment of a multi-host computer graphics system.

Reference is now made to FIG. 8, which is a diagram of another embodiment of the present invention. In this embodiment, a graphics apparatus 830 is configured to generate a single, composite video signal 840 based on a plurality (n) of video signal supplied to an interface 834 of the graphics apparatus 830 from a pool of render nodes 820. In this embodiment, the pool of render nodes 820 comprises a plurality of render nodes that are configured to collectively render a graphics image based on graphics information provided from a selected host 812, 814 or 816. An interface 832 is provided in the graphics apparatus 830 for receiving outputs from the individual hosts 812, 814, and 816.

The graphics apparatus 830 comprises logic 835 that is configured to selectively couple one host 812, 814 or 816 from a plurality of hosts with the pool of render nodes 820. Subsequent to this selection, graphics information output from the selected host is communicated to the pool of render nodes 820. This communication may be direct, may be through network coupling the hosts 812, 814, and 816 with the pool of render nodes 820, or may be through the graphics apparatus 830.

In one embodiment, the graphics apparatus 836 comprises logic that configures the pool of render nodes 820 to render graphics from information supplied from a selected host. Specifically, as a new or subsequent hosts is selected, the logic 836 reconfigures the pool of render nodes to render graphics based on information supplied from the newly selected host. In conjunction with this configuration, the graphics apparatus 830 comprises logic 838 that obtains and relays state information from the newly selected host 812, 814, or 816 to the pool of render nodes 820. In the illustrated embodiment, this information is relayed via communication path 824.

What is claimed is:

1. A system rendering graphics comprising:
   at least two hosts operatively coupled to a plurality of render nodes, the plurality of render nodes to collectively render a graphics image in response to graphics information supplied from a selected host; and
   logic to alternatively select one host from the at least two hosts as the selected host, the logic further to control the plurality of render nodes based on which host is the selected host so as to render a graphics image based on content supplied by the selected host and discard, without rendering, content being supplied by any other said host.

2. The system of claim 1, wherein the plurality of render nodes are to render three-dimensional graphics.

3. The system of claim 1, wherein the logic further comprises a controller to recognize a request from a user designating a new selected host.

4. The system of claim 1, further comprising logic to clear an old host state from the plurality of render nodes.

5. The system of claim 1, further comprising logic to determine a new state of a newly selected host.

6. The system of claim 5, further comprising logic to supply the new state to the plurality of render nodes.

7. The system of claim 1, wherein a compositor comprises the logic.

8. In a graphics system, a method comprising:
   providing a plurality of hosts, each host capable of executing an application program resulting in the output of graphics information,
   utilizing a plurality of render nodes to collectively render a three-dimensional graphics image based on graphics information supplied to the plurality of render nodes by a host;
   identifying a request to switch to a new active host and not render output from any other said host; and
   in response to the request, utilizing the plurality of render nodes to collectively render a graphics image based on graphics information supplied to the plurality of render nodes by the new active host, while discarding, without rendering, graphics information output to said render nodes for rendering by any of said plurality of hosts other than said new active host.

9. The method of claim 8, wherein the utilizing more specifically comprises utilizing the plurality of render nodes to collectively render a three-dimensional graphics image.

10. The method of claim 8, further comprising causing state information maintained by the render nodes to be cleared.

11. The method of claim 10, further comprising determining state information of the new active host.

12. The method of claim 11, further comprising communicating the state information to the render nodes.

13. The method of claim 8, wherein the request is initiated from a keyboard that is coupled to a compositor.

14. The method of claim 8, further comprising causing the second host to direct graphics content to the plurality of render nodes for rendering.

15. An apparatus for generating a composite video signal from a plurality of independent video signals comprising:
   inputs to receive the plurality of video signals delivered from a plurality of render nodes; inputs to receive graphics information from a plurality of hosts;
   logic to selectively combine the graphics information received from only one of the plurality of hosts with the plurality of video signals received from the plurality of render nodes to generate a single, composite video signal, said logic further to discard, without rendering, graphics information from any of the other hosts of the plurality of hosts.

16. The apparatus of claim 15, further comprising logic to recognize a request from a user designating a new selected host, wherein the selected host is one of the plurality of hosts.

17. The apparatus of claim 15, further comprising logic to cause, in response to a request to change a selected host, the plurality of render nodes to clear an old host state.

18. The apparatus of claim 15, further comprising logic to determine state information for a newly selected host.

19. The apparatus of claim 18, further comprising logic to supply the determined state information to the plurality of render nodes.

20. The apparatus of claim 18, wherein the logic to determine state information queries the newly selected host for state information.

21. An apparatus for generating and viewing a composite video signal comprising:
   a plurality of host devices, each outputting video content;
   a plurality of rendering nodes to render said video content from a selected one of the said host devices, each node outputting a separate video signal based on video content from said selected host device, wherein said apparatus discards, without rendering, video content output by said host device other than said selected host device, without external instruction to discard that video content;
   a compositor to receive the plurality of video signals output by said rendering nodes and aggregating said plurality of video signals into a composite video signal;
   a display device to receive and display said composite video signal; and
   means for controlling which host provides output that is rendered by said rendering nodes and delivered to said display device such that a user can select which host among said plurality of host devices is providing video content to said display device.

22. The apparatus of claim 21, wherein rendering nodes are configured to render a three-dimensional graphics image.

* * * * *